(No Model.)
T. B. BLANTON.
MILK COOLER.
No. 508,202. Patented Nov. 7, 1893.
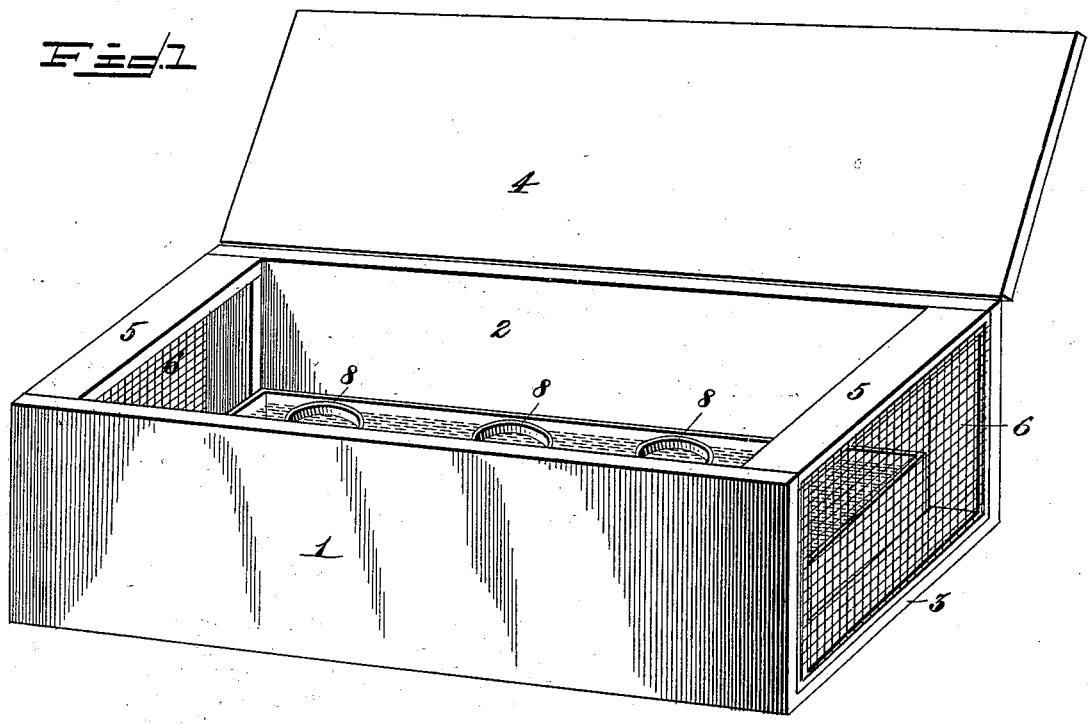
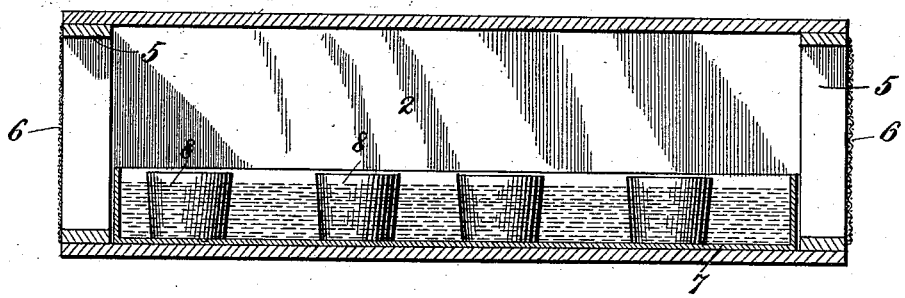
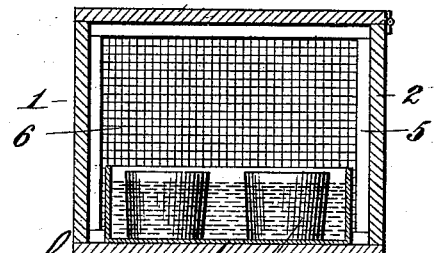
Witnesses
A. B. Mattingly.
John H. Diggers.
Inventor
T. B. Blanton.
By his Attorneys,
C. A. Snow & Co.

UNITED STATES PATENT OFFICE.

TULLIUS B. BLANTON, OF TAYLOR, TEXAS.

MILK-COOLER.

SPECIFICATION forming part of Letters Patent No. 508,202, dated November 7, 1893.

Application filed January 31, 1893. Serial No. 460,323. (No model.)

*To all whom it may concern:*

Be it known that I, TULLIUS B. BLANTON, a citizen of the United States, residing at Taylor, in the county of Williamson and State of Texas, have invented a new and useful Improvement in Milk-Coolers, of which the following is a specification.

My invention relates to improvements in milk-coolers, and of that class thereof employed for setting milk for cream raising; and the objects in view are to utilize the currents of air, cooling the same to the proper temperature by passing them over a body of water, bringing said currents in contact with the milk and in connection with it and the surrounding water cooling the milk.

With these general objects in view the invention consists in certain features of construction hereinafter specified and particularly pointed out in the claim.

Referring to the drawings:—Figure 1 is a perspective view of an apparatus constructed in accordance with my invention the same being shown open. Fig. 2 is a vertical longitudinal sectional view of the apparatus. Fig. 3 is a transverse sectional view.

Like numerals of reference indicate like parts in all the figures of the drawings.

In constructing the apparatus I employ a box or casing, and the same comprises a front and a rear wall designated as 1 and 2 respectively, a bottom 3, opposite open ends, and a removable cover 4. Within the open ends of the casing there are secured screen frames 5, the same being covered by a reticulated cloth 6 adapted to permit of a free circulation therethrough of air and yet exclude any foreign bodies, as dust, &c. Seated removably between the frames 5 and upon the bottom 3 is a metallic tank 7, and in the operation of my invention the aforesaid tank is nearly if not quite filled with water. Into this tank there is placed a series of creaming pans 8, the upper edges of the pans being slightly above the water line.

This completes the construction of my invention and the operation of the same, though obvious, I will briefly explain as follows: Having filled the tank with water and placed the creaming pans in position the lid 4 is closed, whereby, as will be seen, dust, &c., is excluded from the interior of the apparatus, as are also insects, stock, &c. The ends of the casing being left open it will be seen that a current of air is induced to enter one end and pass through the apparatus over the body of water and out the other end. The contact of the current of air with the body of water lowers the temperature of the air, the water being evaporated by such contact; the cool air passing over the milk in connection with the body of water surrounding the pans serves to promote and accelerate the raising of cream thereon. It will thus be seen that without the use of ice or other artificial refrigerating means I am enabled to promote or accelerate raising cream upon the surface of milk, and I have found the same to be much more expedient than the ordinary manner of setting the creaming-pans in milk-houses and similar structures, in that, as is well known to those conversant with cream raising, the setting of milk in the outer atmosphere greatly facilitates the raising of cream and also tends to preserve the milk and maintain the same sweet for a much longer time than where the milk is inclosed in tight coolers, milk-houses, and the like, in that the animal odors can freely pass therefrom, and a constant ventilation is maintained.

Having described my invention, what I claim is—

In a milk-cooler of the class described, the combination with a rectangular casing having opposite open ends, and screens arranged therein, of an oblong water-receiving open or coverless tank arranged between the ends within the casing and of a less depth than the screen-frames, and a series of coverless creaming cans arranged in said tank, and agreeing in depth therewith, substantially as specified.

In testimony that I claim the foregoing as my own I have hereto affixed my signature in the presence of two witnesses.

TULLIUS B. BLANTON.

Witnesses:
D. O'CONNOR.
GEORGE R. SCOTT.